H. I. MAHON ET AL 3,455,460

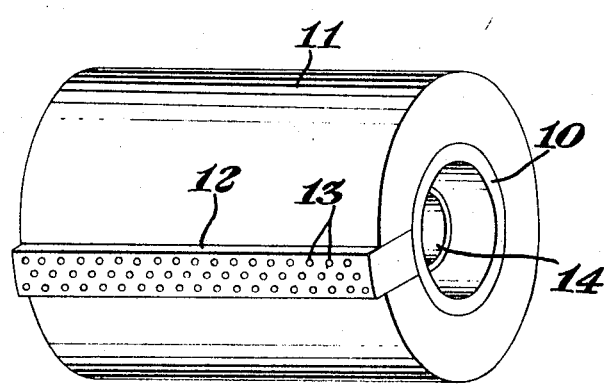
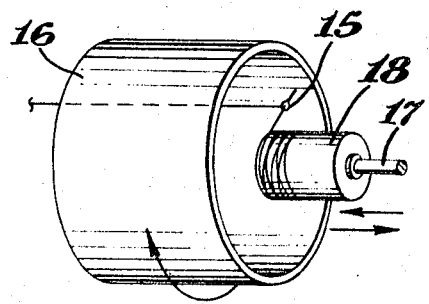
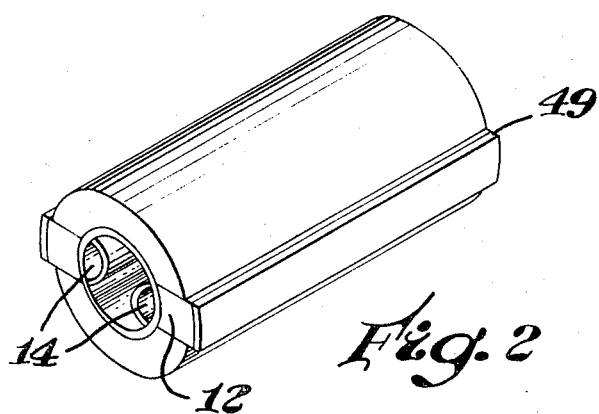
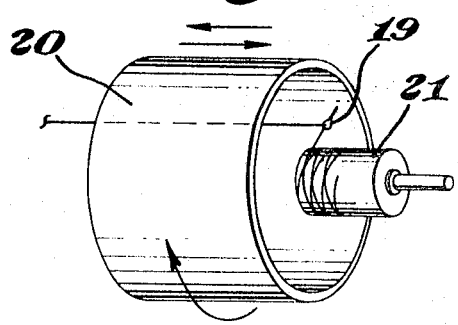
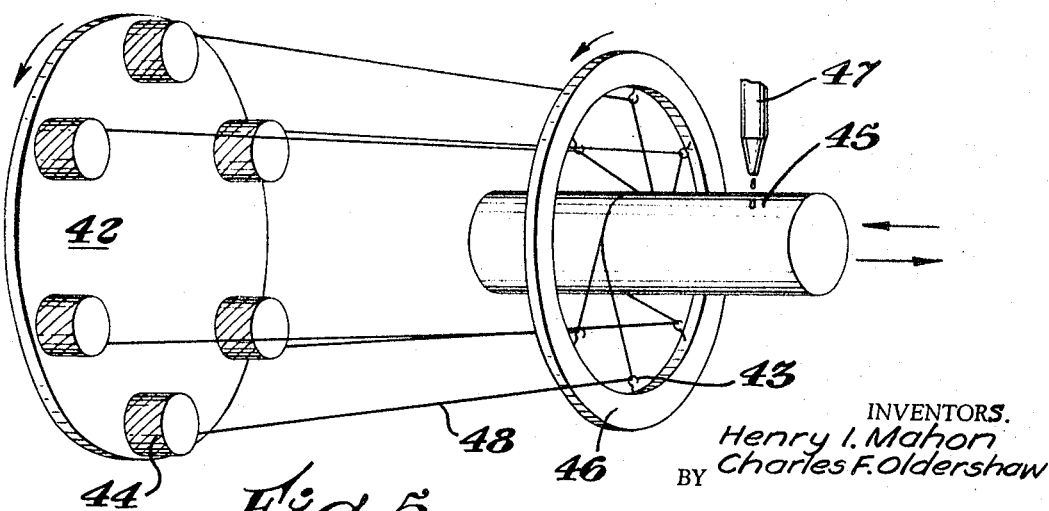

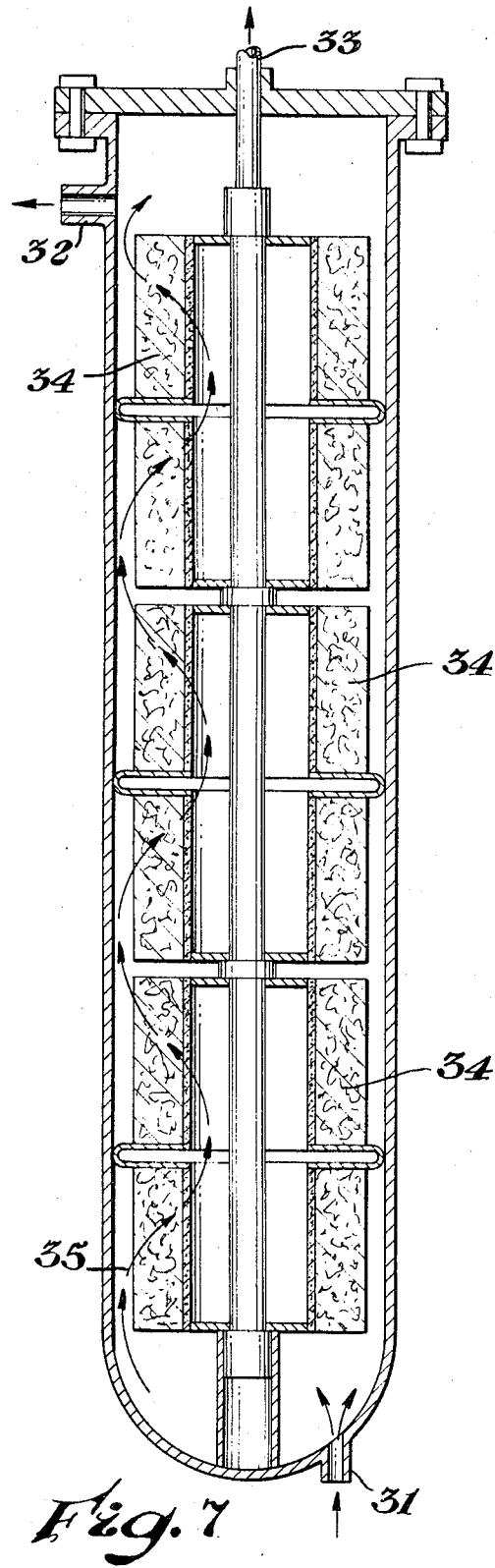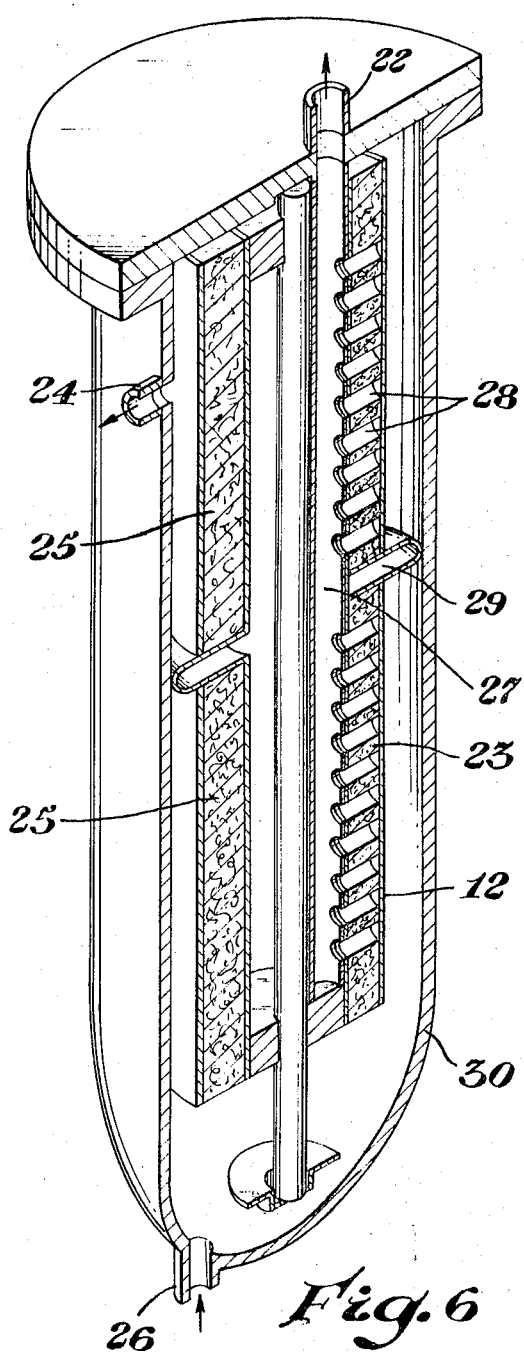
Fig. 7
Fig. 6
INVENTORS.
Henry I. Mahon
Charles F. Oldershaw
BY
Griswold & Burdick
ATTORNEYS July 15, 1969

PERMEABILITY SEPARATORY APPARATUS AND PROCESSES OF MAKING AND USING THE SAME

Filed Aug. 8, 1968

INVENTORS.
Henry I. Mahon
Charles F. Oldershaw
BY

Griswold & Burdick
ATTORNEYS

United States Patent Office 3,455,460
Patented July 15, 1969

3,455,460
PERMEABILITY SEPARATORY APPARATUS AND PROCESSES OF MAKING AND USING THE SAME
Henry I. Mahon, Walnut Creek, and Charles F. Oldershaw, Concord, Calif., assignors to The Dow Chemical Company, Midland, Mich., a corporation of Delaware
Continuation-in-part of application Ser. No. 615,754, Feb. 13, 1967. This application Aug. 8, 1968, Ser. No. 756,717
Int. Cl. B01d 13/00; C02b 1/74
U.S. Cl. 210—321                                34 Claims

ABSTRACT OF THE DISCLOSURE

A permeability separatory apparatus based on a cartridge made by spirally winding hollow fibers in layers about an inner core, the cartridge having at least one resinous tube sheet adhered to the outer surface of each fiber and extending longitudinally parallel to the axis of the core. Depending on the particular configuration either the tube sheet or the fibers may be cut to expose fiber ends.

CROSS-REFERENCES

This application is a continuation-in-part of our copending application Ser. No. 615,754 filed on Feb. 13, 1967, now abandoned.

BACKGROUND OF THE INVENTION

The present invention relates to an improved and particularly efficient and effective permeability separatory apparatus and especially to a cartridge useful therein. It also relates to a method of assembling such apparatus. More specifically, this invention relates to such apparatus comprising a plurality of hollow fibers of a selectively permeable membrane.

A diversity of membranes are known which, to various degrees, have the property of being selectively permeable to different components of fluid mixtures. Thus, some membranes will pass water while restraining ions. Other membranes will selectively pass ions in solution. Still other membranes possess selective permeation rates for two or more nonionic components of fluid mixtures. Additional types of membranes are the so-called molecular sieve type, such as those utilized for dialysis. These can oftentimes pass ions or other materials but tend to restrain passage of high molecular weight components or are adapted to pass only certain molecular weight fractions of given materials, depending on actual molecular size and proportions thereof.

Reverse osmosis, or ultrafiltration, is one of the most practical applications of permeability separation. For example, when a solution is passed on one side of an osmotic membrane and the corresponding solvent is placed on the other side of the membrane, the solvent will pass through the membrane into the solution. The force causing this transfer varies with the character and concentration of the solution involved. This force is known as the specific osmotic pressure for that solution.

When a pressure differential is applied to the solution (opposed to any pressure that may be exerted on the solvent side of the membrane and in excess of the specific osmotic pressure of the system) a "reverse osmosis" or ultrafiltration is effected. In such cases, solvent from the solution is forced through the membrane while the ions are restrained from passing therethrough.

Substantial pressures are generally required to produce reverse osmosis. For most commercial aqueous ionic solutions, at least one hundred pounds per square inch (100 p.s.i.) is required. Since the rate of mass transfer is directly related to pressure differential, the efficient range of reverse osmosis usually requires pressures of many hundreds of pounds per square inch.

Despite the inherent advantages of separation systems using permeable membranes, there has been only a very limited adoption of such devices on a commercial scale or, for that matter, to any great extent for any purpose whatever. This has been due mainly to the relatively slow rate of transfer of the desired components from one side of the membrane to the other.

Contributing greatly to the ineffectiveness of the generally known devices is the particular design of the membrane system in which the separation is effected. If flat sheets of a permeable membrane are used, they ordinarily must be supported against the forces exerted on them by the pressure differential required to effect permeation. The area of the membrane through which the desired component can flow is, accordingly, limited to those regions where fluid egress finds no interference from the supporting structure.

Commercial use of permeability membranes has been directed primarily to thin, uniplanar membranes which are rigidly supported on grooved, perforated or porous backing members. Obviously, in such an arrangement, a membrane sheet of exceedingly large area or a plurality of such sheets are necessary in order to achieve any practical results. In such installations, "dead" areas (areas which are unavailable for permeation) occur as a result of certain portions of the membranes pressing against the backing plates in the apparatus. Consequently, the "free" area available for permeation is reduced in accordance with the total "dead" area required for supporting the membrane.

In U.S. 3,228,876 and U.S. 3,228,877, both issued Jan. 11, 1966 to Mahon, the concept of using hollow fibers in a permeability separatory apparatus is disclosed.

In U.S. Ser. No. 318,555, filed Oct. 24, 1963 by Earl McLain, there is disclosed an apparatus useful in overcoming many of the disadvantages of prior art devices. The disclosed and claimed apparatus employs hollow fibers wound about a core, the fibers terminating in end flanges.

Other patents disclosing the use of hollow fibers in such devices are U.S. 2,972,349, issued Feb. 21, 1961 to DeWall; U.S. 3,186,941, issued June 1, 1965 to Skiens; U.S. 3,198,335, issued Aug. 3, 1965 to Lewis; and U.S. 3,228,-797, issued Jan. 11, 1966 to Brown et al.

The use of hollow fibers of a membrane material has the advantage that the membrane supports itself against pressures applied on the inside or outside of the fiber. However, in assembling pluralities of fibers to give sufficient total membrane areas through which the flow can be conducted, some arrangements of bundles of fibers can decrease the total permeation rate by virtue of the fact that, where adjacent fibers are in contact with each other, egress or ingress of fluid is impeded. Moreover, such contact and proximity interferes with the rate of flow of fluid on the outside of the hollow fibers.

The present invention, advantageously and with utmost benefit, overcomes the deficiencies and disadvantages of heretofore known techniques and procedures in the instant field of art.

SUMMARY OF THE INVENTION

In accordance with the present invention, maximum efficiency of hollow fiber membranes in a permeability separatory system is achieved with a cartridge wherein a plurality of hollow fibers are wrapped circumferentially about an inner supporting core, preferably wrapped in a spiral arrangement around the core. A small arc of each fiber is embedded in and sealed to at least one longitudinal tube sheet extending radially from the core. The tube sheet may be cut to expose fiber ends and allow fluid flow into or out of said fibers. The invention also contemplates a cartridge comprising two tube sheets in close spaced relationship wherein the terminal portions of said tube sheets are connected to form a rectangular tube sheet and wherein the fibers extending between the longitudinal portions are cut to expose fiber ends. The invention further comprehends the method for assembling the hollow fibers in said cartridge and also a permeability separatory device employing the cartridge.

DETAILED DESCRIPTION OF THE INVENTION

Various materials can be used for making the permeable continous hollow fibers suitable for the practice of this invention. Most of these are organic materials, for example, polymeric materials such as the acetate, triacetate, propionate, nitrate, etc. esters of cellulose, including the mono-, di-, and tri-esters and mixtures of such esters; cellulose ethers, such as methyl, ethyl, hydroxyalkyl, carboxyalkyl, etc. including mixed cellulose ethers; regenerated cellulose; polyvinyl alcohols; polysaccharides; casein and its derivatives; etc. The aforementioned are hydrophilic in character and are more advantageous in the treatment of aqueous fluid compositions.

However, for separation of organic components from fluid mixtures, various hydrophobic materials are particularly suitable, such as: synthetic linear polyamides, polycarbonates, polyvinyl chloride and its copolymers, polyvinylidene chloride and its copolymers, acrylic ester polymers, organic silicone polymers, polyurethanes, polyvinyl formals and butyrals, and mixtures thereof, methacrylate polymers, styrene polymers, polyolefins, such as polyethylene, polypropylene, etc., and other polesters, and mixtures of the foregoing. Acrylonitrile polymers, and also certain cellulose derivatives, such as mixed ether-esters, can be modified to make them either hydrophilic or hydrophobic for which ever characteristic is desired in the practice of this invention.

Any of the foregoing materials, as well as other suitable permeable, hollow fiber-forming materials including glass, etc. can be utilized according to this invention for selective separation of various fluid components as described herein, and where the hollow fiber membrane is either inherently suitable or modified so as to make it suitable for ion exchange purposes, such hollow fibers can be used for ion exchange by the practice of this invention.

Methods of making continuous hollow fibers suitable for the practice of this invention are known in the art, for example, see British Patent 514,638. In general, such fibers are spun by melt, dry or wet spinning techniques depending upon the particular fiberforming materials being used. The spinnerette is selected according to the type of spinning procedure used and the particular dimensions desired in the hollow fiber. For the production of the hollow fiber, the spinnerette has a small annular opening in the orifice through which the spinning composition is extruded.

As a typical example, cellulose triacetate is spun into continuous hollow fibers by a wet spinning process in which the cellulose triacetate, together with whatever plasticizer or modifier is considered desirable to impart ultimately the permeable character, is dissolved in a suitable solvent to form a viscous spinning solution. This solution is extruded through the spinnerette into a coagulant bath. As the extruded solution comes in contact with the bath, the cellulose triacetate coagulates or gels in the desired form of a continuously hollow fiber of uniform wall thickness. If the coagulant bath is appropriate for imparting permeability to the fiber material, this characteristic is imparted to the fiber directly. If the coagulant bath is not so constituted, the fiber is led into a second bath to perform this function. The hollow fiber is then washed free of solvent or reagents and then either is used directly in forming a spiral-wound assembly in accordance with the practice of this invention or is stored on a reel or bobbin or other suitable device for subsequent use.

According to this technique, extremely fine hollow fibers can be produced. The wall thickness is desirably sufficient to withstand the pressure that will be exerted in the subsequent permeability separation utilization of these fibers. Generally, a capability of withstanding pressures of 100 lbs. per square inch or more is desired. It is found that the small diameters of these fine hollow fibers permit the self-supporting membrane walls of the fiber to withstand considerable pressures.

It is generally preferred that the outside diameter of the hollow fibers does not exceed 350, advantageously no more than 300 microns. Preferably the outside diameters are in the range of about 10 to about 50 microns. Advantageously, a wall thickness to outside diameter ratio of from about ⅛ to ⅓ is employed in the hollow fibers. Profitably, the wall thickness of the fibers is in the range of about 1 micron to about 80 microns, preferably from about 2 to about 15 microns. Wall thicknesses below this range may result in an inability to withstand the desired pressures, whereas thicknesses above this range increase the resistance to permeation through the fiber wall. Obviously, these characteristics will vary somewhat with the particular material being used and also the particular type of separation involved.

The transfer area of a permeability cell of this invention will vary according to the various dimensions of the hollow fiber, the type of winding used on the supporting core and the length, inside diameter and outside diameter of the wound bundle.

In the accompanying drawings which are more fully referred to in the description following:

FIGURE 1 is an elevational view of a cartridge of spirally-wrapped hollow fibers wrapped on an inner cylindrical core with a drilled tube sheet;

FIGURE 2 is a representation of a cartridge having two longitudinal tube sheets showing tube sheet covers in place;

FIGURE 3 is a schematic representation of one technique for making the cartridge of this invention;

FIGURE 4 is a schematic representation of a different technique for making the cartridge of this invention;

FIGURE 5 is a schematic representation of an apparatus useful in making the cartridge of this invention;

FIGURE 6 is an elevational, sectional view of the overall structure of one embodiment of a permeability cell utilizing the cartridge of the present invention;

FIGURE 7 is a schematic elevational, sectional view of another embodiment of a permeability cell employing six cartridges arranged in tandem;

Figure 8:
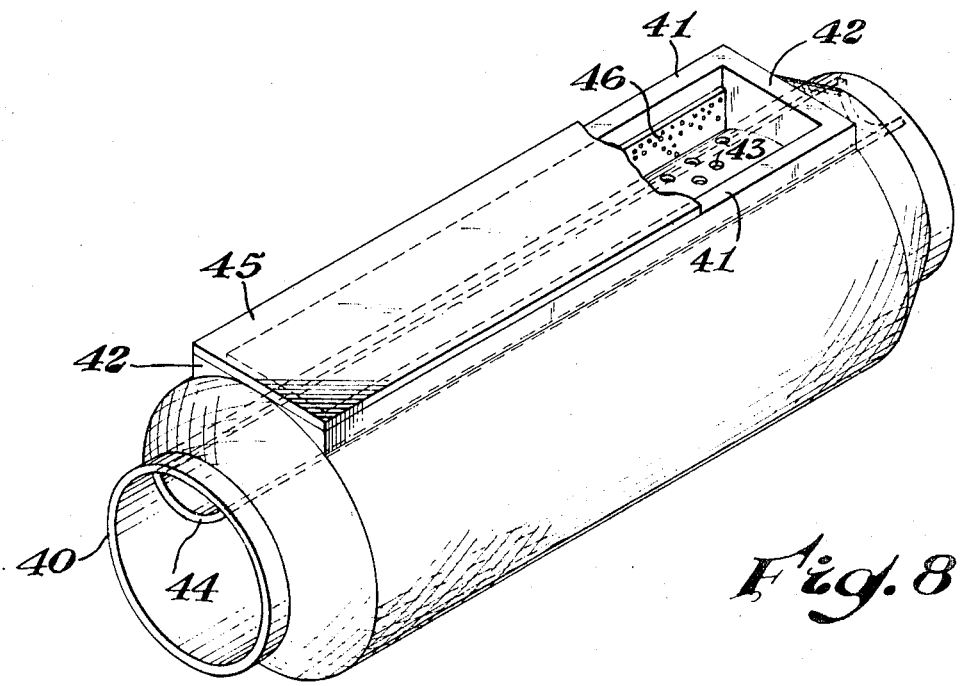
FIGURE 8 is a representation of a cartridge having two longitudinal tube sheets in close spaced relationship wherein the terminal portions of the longitudinal tube sheets are joined to form a rectangular tube sheet.

The cartridge illustrated in FIGURE 1 has an inner core 10 around which are wound a number of layers of hollow fibers 11. A rigid resinous tube sheet 12 of rectangular cross section and disposed longitudinally to the core 10 and essentially normal to the longitudinal axis of fibers 11 embeds and seals that arc of the fibers 11 entrapped therein. In the illustrated embodiment, holes 13 are drilled radially inwardly from the outer peripheral surface of tube sheet 12 through core 10. Only a few such holes 13 are shown but it should be understood that greatest efficiency can be achieved only when the number and disposition of holes 13 is such that each revolution of fiber 11 is intersected. Other means of intersecting the fibers in tube sheet 12 by milling or routing longitudinal slots or by other known cutting techniques may also be used. A channel or conduit 14 is affixed to the inner surface of core 10 to collect permeate from inside the fibers which has flowed out of the inside of the fibers to openings 13 in tube sheet 12. A tube sheet cover plate (not shown) would be secured to the other peripheral surface of tube sheet 12 to cover all openings 13.

It is particularly preferred to cut the fibers by drilling holes through the tube sheet rather than by routing a longitudinal slot because the resulting drilled tube sheet is self supporting. When a longitudinal slot is formed in the tube sheet, a porous permeable support means such as a glass frit or foamed metal sponge generally must be inserted in the slot if the device is to be operated under high pressure differentials.

Although it is highly preferred to cut the fibers by drilling radially inward from the peripheral tube sheet surface it is feasible to drill longitudinally from an end of the tube sheet. It is not necessary to cut each revolution of a given fiber layer although it is preferred to do so in order to minimize resistance to flow through the fibers.

In FIGURE 2, there is represented a generally similar cartridge construction showing two tube sheets 12 with communicating conduits 14 and cover plates 49 in place. When the device of FIGURE 2 is used for blood dialysis, the blood flows through the fibers entering through one of the conduits 12 or 14 and exiting from the other.

In the arrangement of FIGURE 1, the effective length of hollow fibers is the length of one revolution about the core. By that arrangement, the large surface area of some of the prior devices is retained while improving the efficiency of the cartridge, refining the structural detail, and facilitating the preparation of the cartridge. In FIGURE 2, the effective length of the fibers is one half the circumference. Three or more tube sheets could be used, the optimum number depending upon the end use conditions, and other parameters.

The supporting core 10 can be of any appropriate material which will resist the conditions to which it is to be exposed during the formation and use of the permeability cell. Preferably, the core is of a plastic which has no adverse effect on the fiber material and is inert to the fluid which is to be treated.

In the various modifications of this invention wherein the hollow fibers are wound on a supporting core, the question of whether the core is perforated or not depends on the type of flow and other conditions in which the fiber bundle is to be used. The size and positioning of perforations in this core will be determined according to the particular flow conditions desired.

While reference has been made to "perforated" cores, it is also possible to use in the practice of this invention cores made of metal or plastic screen, porous ceramic, fritted glass, fritted metal, etc. It is only necessary where a core of a porous nature is desired, that the core be of sufficient strength to give support to the fibers and to permit flow of the fluid therethrough without disintegration of the core material or reaction with the fluid passing therethrough.

Furthermore, in place of the cylindrical core, cores having other transverse cross-sectional configurations can also be used such as hexagonal, octagonal, elliptical, etc. In some cases, it may even be desirable to use a core having a slight taper so as to have the shape of a truncated cone.

The size of the core is determined by economic considerations and the ease in handling and manufacturing the core and the permeability cell made therewith. A particularly suitable size is a core about 20 inches long, approximately 3¾ inches inside diameter, and 4¼ inches outside diameter, although cores as small as ½ inch outside diameter can be used. The thickness of the winding is dictated primarily by the ease in handling and assembling the permeability cell, and the ability to maintain appropriate flow rates through the bundle. Generally, a thickness of from 0.5 to 10 inches from the inner diameter of the winding to the outer diameter of the winding is advantageous, preferably a thickness of about 2–5 inches is employed.

A particular advantage of the permeation devices described herein is that they incorporate short fiber lengths essential to minimizing resistance to fluid flow through the fibers, however the devices are readily assembled from continuous fibers.

The longitudinal tube sheet 12 may be prepared from any suitable casting resin. The resin formulation should be selected to provide adequate bonding to the fibers, to have suitable machining qualities and have physical and chemical properties to withstand the fluid environment in which the cartridge is to be used. Epoxy resins are found particularly suitable for forming the tube sheet. However, any casting resin which does not adversely affect the fibers and which gives the desired adhesion and strength characteristics can be used for this purpose. Typical examples of other suitable resins are: phenol-aldehyde resins, malamine-aldehyde resins, thermo-setting artificial rubbers, acrylic resins, etc. In addition to having the resin which is applied inert to the fiber material, it is necessary that the resin formulation have sufficient fluidity to penetrate between the fibers so as to fill the space completely, have proper adhesion thereto and provide a fluid-tight seal at the particular pressures and temperatures to which the ultimate product is to be submitted.

Epoxy resins are particularly suited for this purpose because of their inertness to solvents and to chemical corrosion, their setting characteristics and their ability to effect fluid-tight seals under the conditions to which the permeability cell is to be exposed.

Particularly suitable epoxy resins are those derived from the diglycidyl ether of bisphenol together with appropriate modifiers and curing agents. However, other epoxy resins can also be used such as the diglycidyl ethers of resorcinol, dihydroxy diphenyl, hydroquinone, etc. These can be modified by the addition of modifying resins, preferably amine resins, and appropriate curing agents and solvents. Certain materials can be used to serve both as a diluent and also to participate in the curing reaction such as liquid amines.

A particularly suitable casting formulation comprises about 14.7 parts of the diglycidyl ether of bisphenol, about 1.1 part of dimethylamino propylamine, and about 6.8 parts of soya - 1,3 - propylenediamine as the curing agent. Where it is desirable to apply a primer to the metal surfaces to which the casting resin is to adhere, a very suitable composition consists of about 10 parts of diglycidyl ether of bisphenol, about 2.7 parts of N-(2-phenyl - 2 - hydroxyethyl)-diethylenetriamine and about 7.3 parts of acetone.

In FIGURE 3 is illustrated a scheme for preparing cartridges such as those illustrated in FIGURES 1 and 2. In this scheme, a core 18 is mounted on a mandrel 17 attached to reciprocating power means (not shown). A rotating ring 16 having fiber guide 15 is disposed around core 18. The hollow fiber is led from a source through guide 15 to be wrapped about the reciprocating core 18. The angle at which the fiber is wound will be determined by the rotational speed of ring 16 and linear speed of core 18.

A somewhat different embodiment is shown in FIGURE 4 wherein the core 21 is stationary and ring 20 and guide 19 both rotate about and reciprocate past core 21.

In each of the schemes represented in FIGURES 3 and 4, there is resin depositing means (not shown) positioned to reciprocate along a longitudinal line of core (18, 21). Thus, the resin may be sprayed, rolled or extruded onto the winding fibers. Although the fiber winding will usually be a continuous operation, the resin application may be intermittent so that a deposit or ribbon of uncured resin is laid down, the fibers wound into it, then another ribbon of resin and so on. Alternatively, the resin application can be continuous, staying a fixed distance ahead of the fiber winding.

A particular advantage of the above process is that application of the resin to form a longitudinal tube sheet on a non-rotating package is significantly less difficult and more controllable than the formation of radial flange tube sheets on rotating packages.

A preferred embodiment of the cartridge forming operation is shown in FIGURE 5. In that embodiment, a core 45 is mounted on a mandrel (now shown) connected to a suitable reciprocating power source (not shown). Fiber packages 44 mounted on spindles affixed to bed 42 supply hollow fibers 48 singly or in bundles 48 of a multiplicity of hollow fibers through fiber guides 43 mounted in ring 46 to core 45. Ring 46 and bed 42 are rigidly attached to each other to avoid twisting of the fibers 48 during rotation. In operation, core 45 is reciprocated through the center of ring 46 for a distance of its length. The cage formed by bed 42 and ring 46 rotates about an axis through a projected center of core 45. Resin applying means 47 is fixed at a point above core 45 to drip resin onto the core in advance of the winding fibers 48. By means of this embodiment, a plurality of bundles of fibers can be laid down with each traverse of core 45.

The degree of openness of the fiber package can be controlled according to the flow and pressure conditions contemplated in use by varying the pitch angle or longitudinal advance per revolution of fiber. However, in order to attain the benefits of a "criss-cross" contact of successive layers, it is essential to maintain a pitch angle of not less than 5° when winding.

After winding, the resin in the tube sheet is cured by known procedures, such as by exposure to elevated temperatures. In any such procedure, care must be exercised not to adversely affect the hollow fibers on the interfacial seal between fiber and tube sheet.

The cured tube sheet is then cut radially inwardly to intersect each revolution of fiber. The cutting can be done in a number of ways. For example, a series of holes can be drilled radially inwardly from the outer surface of the tube sheet to the surface of the core or through the core. The size, number, and placement of holes is such that each fiber is intersected at least once each revolution. Whether or not the holes will penetrate the core will depend on the desired location of the communicating conduits. If the holes are drilled through the core, then a channel member, as for example channel 14 of FIGURE 1, is sealed to the inner surface of the core to embrace all of the area encompassing the drilled holes. Outlet means can then be secured to the conduit for conveying liquids outside the separatory element.

Alternatively, the holes may be terminated at the inner winding of hollow fibers. In this case, grooves or channels can be routed or milled into the peripheral surface of the tube sheet to communicate with all of the holes. An outlet can be bored through the tube sheet, as for example through one end, so that liquids can travel from the inside of the fibers to outside the separatory element through the channel formed when a cover plate (49 in FIGURE 2) is secured to the tube sheet.

The same principles will apply with other means of intersecting the fibers. Other such means will be apparent to the skilled worker.

In FIGURE 6, there is shown a separatory element employing two cartridges 25 mounted in tandem in a pressure vessel 30. The packages shown have radial holes 28 drilled in the tube sheets 23 to communicate with the fiber cores and the holes 28 connect with a permeate channel 27 inside the package core. The permeate channel 27 of the two packages 25 are joined together and to a permeate outlet 22 at the top of the cell.

The outboard ends of the two packages are sealed to the central supporting rod. A baffle 29 is installed between the packages 25. The purpose of baffle 29 is to direct the flow of fluid which is in contact with the outside of the fibers from the outside-in in the lower package and from the inside-out in the upper package. The baffle 29 and the plugs at the outboard ends of the packages need not be high pressure seals. These seals must withstand only the pressure difference developed by the fluid flow across them.

The purpose of the reverse flow path of alternate packages in tandem is to facilitate backwashing. If there is particulate matter in the feed, it will accumulate on the outside surface of the lower package. Periodically, the saline water flow path may be reversed to remove the accumulated solids. Outlet 24 is installed in vessel 30 to remove the effluent after exposure to the separatory means in the cartridges 25. The permeate is led from conduit 27 out the outlet 22 in vessel 30 to be collected in a suitable inventory means.

FIGURE 7 shows six packages 34 mounted in tandem in a pipe cell with alternately reversed saline solution flow pattern 35. This cell construction will minimize cell costs. The case is made of pipe with one end closed and the other flanged. The packages 34 are assembled on the central supporting rod and the permeate outlets are connected. The string of packages 34 are installed in the case and the external permeate connection 33 made. Saline solution is introduced at inlet 31 and the solution which passes between the fibers is drained at outlet 32. The number of packages in tandem would be limited by the overall pressure drop due to fluid flow in series through the packages 34. In reverse osmosis, this pressure drop would reduce the available driving force. Maximum utility and efficiency is attained when the number of packages in series is on the order of 10.

In desalination, the saline water feed would be pumped into one end of the cell at a pressure exceeding the osmotic pressure of the solution. Fresh water which permeates the hollow fiber walls by reverse osmosis would discharge through the permeate outlet. Saline water would flow in series through the packages becoming increasingly concentrated en route. Part of the pressure energy in the discharged brine could be recovered by an impulse turbine.

Figure 9:
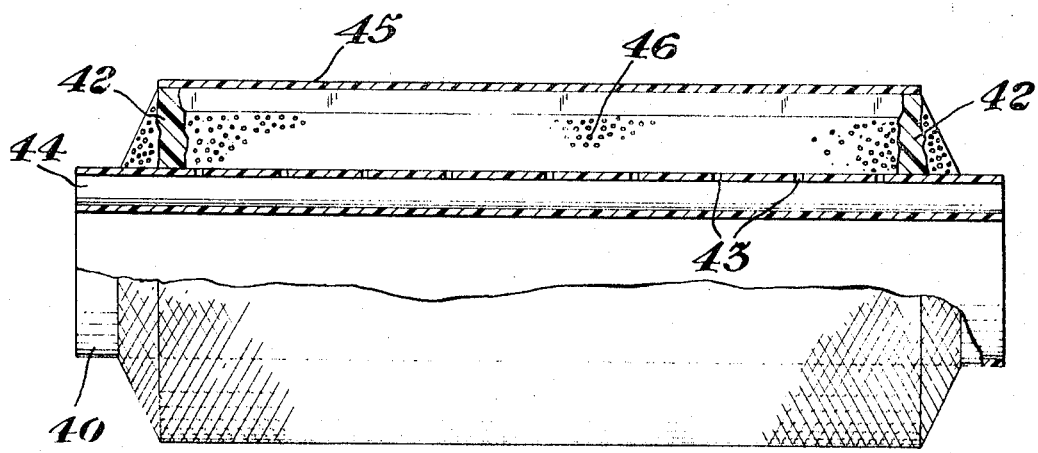
FIGURE 9 is an elevational view of the cartridge of FIGURE 8 partly in cross section also showing a tube sheet cover.

Another embodiment of this invention is illustrated in FIGURES 8 and 9. In FIGURE 8 is shown a cartridge prepared according to the process of the invention wherein hollow fibers are spirally wound about a supporting core 40. Simultaneously, two essentially parallel longitudinal tube sheets 41 are formed by applying ribbons (or beads, etc.) of resin in two close spaced apart parallel zones as previously described. Connecting headers 42 between the terminal portions of the longitudinal tube sheets 41 are prepared by injecting resin into the fibers in the connecting zones thereby forming a rectangular tube sheet member extending radially from the core 40. The core area encompassed within the rectangular tube sheet member has openings 43 to permit fluid to flow into or out of conduit 44. A tube sheet cover 45 is secured in fluid sealing relationship to the rectangular tube sheet member. Access to the interior of the fibers is obtained by cutting the portions of fibers enclosed within the tube sheet member to expose fiber ends 46. FIGURE 9 shows a side elevation view partially in cross-section, of the cartridge of FIGURE 8.

Advantageously, the cartridge in FIGURES 8 and 9 does not require drilling or cutting of a hard resinous tube sheet which can be expensive when resins such as epoxy resins are used, but rather only the fiber itself need be cut which is readily and simply done. In any of the devices of FIGURES 1, 2, 7, 8 or 9 the need for a porous spacer between the longitudinal tube sheets is dependent on the strength of said portions and on the operating pressure employed.

Other means of communicating with the open fiber ends than the conduit 44 and openings 43 may be used. For example, cover plate 45 could have at least one fluid connection to the interior chamber defined by the cover and the rectangular tube sheet member from which fluid would be admitted or withdrawn depending on the method of operation. In such an embodiment there would be no need for the openings 43.

The present inventive concept will be illustrated with the following examples which are not intended to be limiting.

EXAMPLE 1

A longitudinal tube sheet permeation device was wound with a sixteen filament strand of hollow cellulose triacetate fiber having an O.D. of 41 microns and an I.D. of 21 microns. During spinning, the fiber strand was spirally wound on a cardboard core with a Model 970 take-up winder made by the Leesona Co., Providence, Rhode Island. To make the permeation device, the fiber strand was unwound off the end of the Leesona package through a guide rotating at 375 r.p.m. onto a cylindrical core in an oscillating winder at 25 strokes per minute for a stroke length of 5 inches. The buildup of fiber was 375 grams. The core was a 6½ inch long by 4 inch O.D. brass tube. The tube was perforated in the center 4½ inch long section except for the area under the tube sheet.

The tube sheet resin formulation was as follows:

| | Percent |
|---|---|
| Resorcinol diglycidyl ether | 27.3 |
| 1,4-butanediol diglycidyl ether | 13.7 |
| Propylene glycol monoricinoleate | 13.7 |
| Chlorophenylene oxide | 5.5 |
| Nonionic surface-active agent | 1.4 |
| Maleic anhydride | 37.4 |
| N-methyl morpholine | 1.0 |
| Colloidal silica thickener added | 2.5 |

During rewinding onto the core, the tube sheet resin was extruded intermittently through a hypodermic needle onto the fiber package. The resin was cured at 50 degrees centigrade overnight into a tube sheet the length of the fiber windings and 2 inches in width.

After the resin was cured, 2 rows of holes of $3/16$ inch diameter were drilled radially through the longitudinal tube sheet so as to intersect every revolution of fibers. The holes in each row were on $5/32$ inch centers and the rows were $3/8$ inch apart.

The holes did not extend through the brass core. Channels ⅛ wide by $3/16$ inch deep were milled in the outer surface of the tube sheet to provide connecting outlets for all of the permeate holes. After milling, the outer surface of the tube sheet was covered with epoxy resin fiber glass and cured. A hole was then drilled in the end of the tube sheet and a tubing connection installed to provide a permeate outlet.

The package was installed in a pressure vessel and saline water (slightly diluted sea water containing 18 grams per liter total dissolved salt) was pumped radially through the package over the outside of the fibers at 600 p.s.i.g. Permeate was collected at the permeate outlet at the rate of 1.9 to 2.4 cm.$^3$/min. The permeate analyzed 3.4 grams per liter total disolved salt.

The concept of the invention can be employed in a variety of separations exemplary of which are the following:

(1) Sea water desalination by reverse osmosis in which the sea water is pumped through the fiber interiors.

(2) Water removal by osmosis such as the concentration of fruit juices. The fuit juice is pumped over the outside of the fibers and an aqueous solution of high osmotic strength is pumper through the cores. Water permeates from the juice into the fiber cores.

(3) Dialysis operations such as the artificial kidney. Blood is pumped through the fiber interions and the wash solution is pumped over the outside of the fibers.

The advantage of this package construction over the earlier concept of parallel fibers is better flow distribution over the outside of the fibers and easier construction. The spiral pattern offers uniform resistance to radial flow; hence, the flow distribution is uniform and no "dead" pockets develop.

In these applications, individual packages would probably be used rather than series coupling.

What is claimed is:

1. A method of forming a cartridge useful in a permeability separatory element, said method comprising the steps of:
   (a) spirally winding at least one continuous, hollow, permeable fiber on a supporting core;
   (b) continuing the winding of said hollow fiber on said core to build up layers of fiber windings running from one end of said core to the other end of said core, the fibers being so positioned that the points of contact between said hollow fibers in adjacent layers represent no more than a very small proportion of the outer surface of said fibers;
   (c) impregnating with a casting resin the space between said hollow fibers in at least one region parallel to the longitudinal axis of said core, the resultant impregnated region having a cross-section extending radially outwardly from the outer surface of said core to at least the outermost winding of said hollow fibers and having a sealing relationship therewith;
   (d) curing the so-formed longitudinal tube sheet to a solid state;
   (e) cutting said longitudinal tube sheet to intersect said fibers so as to provide fiber openings at the cut surface of said tube sheet;
   (f) providing covering means over the outer surface of at least the cut portion of said longitudinal tube sheet; and
   (g) providing conduit means to communicate with the fiber openings in said tube sheet and the outside of said cartridge.

2. The method of claim 1 in which said winding of said hollow fiber is effected spirally around said core, the resultant spiral winding being reversed in direction each time said winding approaches the end of said core, thereby producing a plurality of spiral windings, one superimposed on another with alternate windings being spirally wound in the same direction and intermediate spiral windings being spirally wound in the opposite direction.

3. The method of claim 1 in which said hollow fiber is supported by said core and the spiral winding is at an angle of at least 5° to the axis of said core.

4. The method of claim 1 in which said tube sheet is prepared by the application of a resin formulation in the specified region during said winding operation.

5. The method of claim 1 in which said fibers are cut by the routing of a continuous channel the length of said tube sheet for a distance between the terminal windings of said hollow fibers and wherein a permeable support means is inserted in said channel.

6. The method of claim 1 in which said tube sheet is prepared by the impregnation of said area after said winding has been completed.

7. The method of claim 1 in which said fibers are cut by drilling holes longitudinally into said tube sheet from an end surface thereof.

8. The method of claim 1 wherein said hollow fibers are made of cellulose triacetate.

9. The method of claim 1 wherein said casting resin is an epoxy resin.

10. The method of claim 1 wherein said core is impermeable in the region adjacent said tube sheet and conduit means are achieved by a channel through one end of said tube sheet to communicate with said holes.

11. The method of claim 1 in which said fibers are cut by drilling holes radially inwardly to said core from the peripheral surface of said tube sheet, with the holes being of such size and arranged in such a pattern that each fiber is cut at least once.

12. The method of claim 11 wherein a continuous portion of the peripheral surface of said tube sheet is routed out, said portion encompassing the area of the holes.

13. The method of claim 11 wherein said holes are drilled through the core and wherein said holes communicate with conduit means attached to the inner surface of said core.

14. A method of forming a permeability separatory element, said method comprising the steps of:
   (a) spirally winding at least one continuous, hollow, permeable fiber on a supporting core;
   (b) continuing the winding of said hollow fiber on said core to build up layers of fiber windings running from one end of said core to the other end of said core, the fibers being so positioned that the points of contact between said hollow fibers in adjacent layers represent no more than a very small proportion of the other surface of said fibers;
   (c) impregnating with a casting resin the space between said hollow fibers in at least one region parallel to the longitudinal axis of said core, the resultant impregnated region having a cross-section extending radially outwardly from the outer surface of said core to at least the outermost winding of said hollow fibers and having a sealing relationship therewith;
   (d) curing the so-formed longitudinal tube sheet to a solid state;
   (e) cutting radially inwardly through said longitudinal tube sheet to intersect said fibers so as to provide fiber openings at the cut surface of said tube sheet;
   (f) providing covering means over the outer surface of at least the cut portion of said longitudinal tube sheet;
   (g) providing conduit means to communicate with the fiber openings in said tube sheet and the outside of said cartridge; and
   (h) enclosing each resultant core portion together with the attached fiber winding and tube sheet portions in an outer shell with means for introducing fluid to the annular area between the fiber windings and said shell or to the inside of said core.

15. A method of forming a cartridge useful in a permeability separatory element, said method comprising the steps of:
   (a) spirally winding at least one continuous, hollow, permeable fiber on a supporting core;
   (b) continuing the winding of said hollow fiber on said core to build up layers of fiber windings running from one end of said core to the other end of said core, the fibers being so positioned that the points of contact between said hollow fibers in adjacent layers represent no more than a very small proportion of the outer surface of said fibers;
   (c) impregnating with a casting resin the space between said hollow fibers in two essentially parallel regions in close spaced apart relationship, said regions generally parallel to the longitudinal axis of said core and said resin impregnated regions extending radially outwardly from the outer surface of said core to at least the outermost winding of said hollow fibers and having a sealing relationship therewith;
   (d) impregnating with a casting resin the space between said hollow fibers in the connecting regions between the terminal portions of said parallel regions thereby forming an essentially rectangular tube sheet member extending radially outwardly from said core and having a sealing relationship with the fibers therein;
   (e) curing the so-formed rectangular tube sheet member to a solid state;
   (f) cutting said fibers disposed within said rectangular tube sheet member to provide fiber openings;
   (g) providing cover means over said rectangular tube sheet members;
   (h) providing conduit means to communicate with the fiber openings in said tube sheet and the outside of said cartridge.

16. The method of forming a permeability separatory element comprising enclosing the cartridge prepared according to the method of claim 15 in an outer shell wherein said shell has means to admit and withdraw fluid from the annular area between the fiber windings and said shell and fluid connecting means to said cartridge conduit means.

17. A cartridge useful in a separatory element comprising:
   (a) a supporting core;
   (b) a multiplicity of continuous hollow, permeable, organic fibers wound circumferentially about said core and with the fiber windings extending from one end of said core to the other, the fibers being so positioned that the points of contact between said hollow fibers in adjacent layers represent no more than a very small proportion of the outer surface of said fibers;
   (c) a rigid longitudinal resinous tube sheet extending radially from said core to the outer layer of fiber windings and being cut to expose both ends of each fiber, each said hollow fiber extending into said tube sheet with the outer surface of that portion of said fiber which passes through said tube sheet to its exposed end being in a fluid-tight sealing arrangement with said tube sheet;
   (d) covering means over the outer surface of at least the cut portion of said tube sheet; and
   (e) conduit means communicating with the fiber openings in said tube sheet and the outside of said cartridge.

18. The cartridge of claim 17 in which said fibers are cut by the routing of a continuous channel the length of said tube sheet for a distance between the terminal windings of said hollow fibers and wherein a permeable support means is inserted in said channel.

19. The cartridge of claim 17 wherein said hollow fibers are made of cellulose triacetate.

20. The cartridge of claim 17 wherein said casting resin is an epoxy resin.

21. The cartridge of claim 17 wherein said core is permeable in the region adjacent the portion of said tube sheet and said permeable region communicates with conduit means attached to the inner surface of said core.

22. The cartridge of claim 17 wherein said core is impermeable in the region adjacent said tube sheet and conduit means are achieved by a channel through one end of said tube sheet to communicate with said holes.

23. The cartridge claimed in claim 17 in which said winding of said hollow fiber is effected spirally around said core, the resultant spiral winding being reversed in direction each time said winding approaches the end of said core, thereby producing a plurality of spiral windings one superimposed on another with alternate windings being spirally wound in the same direction and intermediate spiral windings being spirally wound in the opposite direction.

24. The cartridge of claim 23 in which said hollow fiber is supported by said core and the spiral winding is at an angle of at least 5° to the axis of said core.

25. The cartridge of claim 17 in which said fibers are cut by drilling holes radially inwardly to said core from the peripheral surface of said tube sheet, with the holes being of such size and arranged in such a pattern that each fiber is cut at least once.

26. The cartridge of claim 25 wherein a continuous portion of the peripheral surface of said tube sheet is routed out, said portion encompassing the area of the holes.

27. The cartridge of claim 17 in which said hollow fiber has an outside diameter of not more than about 350 microns.

28. The cartridge of claim 27 in which said hollow fiber has an outside diameter of from about 10 to about 50 microns.

29. The cartridge of claim 27 in which said hollow fiber has a wall thickness of from about 1 to about 50 microns.

30. The cartridge of claim 27 in which said hollow fiber has an outside diameter of less than 350 microns and a wall thickness to outside diameter ratio of from about ⅛ to about ⅓.

31. A separatory element comprising an inner cartridge and outer shell, said cartridge comprising:
   (a) a supporting core;
   (b) a multiplicity of continuous hollow, permeable, organic fibers wound circumferentially about said core and with the fiber windings extending from one end of said core to the other, the fibers being so positioned that the points of contact between said hollow fibers in adjacent layers represent no more than a very small proportion of the outer surface of said fibers;
   (c) a rigid longitudinal resinous tube sheet extending radially from said core to the outer layer of fiber windings and being cut to expose both ends of each fiber, each said hollow fiber extending into said tube sheet with the outer surface of that portion of said fiber which passes through said tube sheet to its exposed end being in a fluid-tight sealing arrangement with said tube sheet;
   (d) covering means over the outer surface of at least the cut portion of said tube sheet;
   (e) conduit means communicating with the fiber openings in said tube sheet and the outside of said cartridge; and
   (f) said outer shell having a configuration and size in the adjacent inner region thereof conforming to the approximate size and outer configuration of said cartridge, said outer shell enclosing and supporting the core and said fibers positioned thereon and having means for permitting the flow of fluid therethrough.

32. The separatory element of claim 31 in which:
said core has a plurality of pores spaced from each other and distributed over a substantial portion of the cylindrical portion thereof;
said outer shell has a channel cover fastened to and forming a fluid sealing realtionship therewith in a region located near said tube sheet and communicating with the open end of said fiber extending through said tube sheet, said channel cover having a fluid outlet communicating with that portion of said channel cover which is in communication with the open end of said fiber and adapted to permit the flow of fluid from said fiber and out of said channel cover through said outlet;
said core having a fluid inlet means adapted to conduct fluid to the inner region thereof near one end of said core;
said outer shell having a fluid outlet at a point remote from that end of said core near which said fluid inlet is adapted to flow fluid into the inner region of said core;
said element being adapted to have fluid flow into said interior region of said core, through the pores in said core, into contact with and partially permeating into said fibers, and then the non-permeating portion of said fluid flowing out and through said outer shell fluid outlet, the fluid component which permeates to the inner region of said hollow fiber flowing into the interior region of said channel cover and out through said fluid outlet in said channel cover.

33. A cartridge useful in a separatory element comprising:
   (a) a supporting core;
   (b) a multiplicity of continuous hollow permeable organic fibers wound circumferentially about said core and with the fiber windings extending from one end of said core to the other, the fibers being so positioned that the points of contact between said hollow fibers in adjacent layers represent no more than a very small proportion of the outer surface of said fibers;
   (c) an essentially rectangular, hard resinous tube sheet member comprising two generally parallel longitudinal elements in close spaced apart relationship which parallel the longitudinal axis of said core and two elements which connect the terminal portions of the said longitudinal elements, said rectangular tube sheet member extending radially from said core to at least the outer layer of fiber windings and having the fibers within said tube sheet cut to expose fiber ends and the portions of said fibers embedded in said tube sheet being in fluid tight sealing arrangement therewith;
   (d) covering means over said rectangular tube sheet members; and
   (e) conduit means communicating with the fiber openings in said tube sheet and the outside of said cartridge.

34. A separatory element comprising the separatory cartridge of claim 33 enclosed within a shell, said shell having means to admit and withdraw fluid from the annular space between the fiber windings and the shell and fluid connecting means to said cartridge conduit means.

References Cited

UNITED STATES PATENTS

| 2,911,057 | 11/1959 | Green et al. | 55—16 |
| 3,019,853 | 2/1962 | Kohman et al. | 55—158 X |
| 3,198,335 | 8/1965 | Lewis et al. | 210—321 |
| 3,342,729 | 9/1967 | Strand | 210—321 X |

REUBEN FRIEDMAN, Primary Examiner

F. A. SPEAR, JR., Assistant Examiner

U.S. Cl. X.R.

29—163.5; 210—497.1